US012620714B2

(12) United States Patent
Onaka et al.

(10) Patent No.: US 12,620,714 B2
(45) Date of Patent: May 5, 2026

(54) ANTENNA MODULE

(71) Applicant: Murata Manufacturing Co., Ltd., Nagaokakyo (JP)

(72) Inventors: Kengo Onaka, Nagaokakyo (JP); Yosuke Sato, Nagaokakyo (JP); Hirotsugu Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 26 days.

(21) Appl. No.: 18/918,133

(22) Filed: Oct. 17, 2024

(65) Prior Publication Data

US 2025/0038415 A1 Jan. 30, 2025

Related U.S. Application Data

(63) Continuation of application No. PCT/JP2023/005375, filed on Feb. 16, 2023.

(30) Foreign Application Priority Data

Apr. 27, 2022 (JP) ................................ 2022-073406

(51) Int. Cl.

*H01Q 9/04* (2006.01)
*H01Q 1/48* (2006.01)
(Continued)

(52) U.S. Cl.

CPC ............ *H01Q 9/0414* (2013.01); *H01Q 1/48* (2013.01); *H01Q 5/10* (2015.01); *H01Q 5/50* (2015.01)

(58) Field of Classification Search

CPC ...... H01Q 9/0414; H01Q 21/065; H01Q 1/38; H01Q 19/005; H01Q 9/0407;
(Continued)

(56) References Cited

U.S. PATENT DOCUMENTS 11,108,157 B2 8/2021 Yamada et al.
2019/0221937 A1* 7/2019 Onaka .................. H01Q 5/385
(Continued)

FOREIGN PATENT DOCUMENTS

| | | |
|---|---|---|
| JP | H08-293717 A | 11/1996 |
| JP | 2010-245893 A | 10/2010 |
| WO | 2020/170722 A1 | 8/2020 |

OTHER PUBLICATIONS

International Search Report and Written Opinion mailed on Apr. 25, 2023, received for PCT Application No. PCT/JP2023/005375, filed on Feb. 16, 2023, 9 pages including English Translation.

*Primary Examiner* — Monica C King
(74) *Attorney, Agent, or Firm* — XSENSUS LLP

(57) ABSTRACT

An antenna module includes a first dielectric substrate at which a first radiating electrode with a flat plate shape is disposed and a second dielectric substrate at which a second radiating electrode shape is disposed. The first dielectric substrate has a first surface and a second surface that are opposite each other. The first radiating electrode is disposed on the second surface of the first dielectric substrate or at a position between the first and second surfaces of the first dielectric substrate. The second dielectric substrate includes a region that is arranged so as abut the first dielectric substrate and a region that is in contact with the first surface of the dielectric substrate. A normal direction of the radiating electrode is different from a normal direction of the radiating electrode.

20 Claims, 10 Drawing Sheets

(51) Int. Cl.
*H01Q 5/10* (2015.01)
*H01Q 5/50* (2015.01)

(58) Field of Classification Search
CPC ...... H01Q 1/2283; H01Q 21/30; H01Q 5/357; H01Q 9/30; H01Q 1/48; H01Q 1/243; H01Q 1/52; H01Q 1/523; H01Q 13/08; H01Q 21/20; H01Q 3/2617; H01Q 5/35; H01Q 7/00; H01Q 9/0428; H01Q 1/22; H01Q 1/28; H01Q 1/32; H01Q 1/3233; H01Q 15/006; H01Q 21/08; H01Q 21/24; H01Q 21/28; H01Q 5/10; H01Q 5/42; H01Q 5/50
See application file for complete search history.

(56) References Cited

U.S. PATENT DOCUMENTS

2020/0411950 A1* 12/2020 Kuroda ................ H01Q 1/2283
2021/0036400 A1* 2/2021 Hashimoto ............ B62J 45/416
2024/0055774 A1* 2/2024 Haratani ................ H01Q 13/08

* cited by examiner

| | FIRST EMBODIMENT | SECOND EMBODIMENT |
|---|---|---|
| ARRANGEMENT |  |  |
| ANTENNA GAIN |  |  |
| PEAK GAIN | 3.28 [dBi] | 5.16 [dBi] |

ANTENNA MODULE

CROSS-REFERENCE TO RELATED APPLICATIONS

The present application is a continuation application of PCT International Application No. PCT/JP2023/005375 filed on Feb. 16, 2023, designating the United States of America, which is based on and claims priority to Japanese patent application JP 2022-073406, filed Apr. 27, 2022. The entire disclosures of the above-identified applications, including the specifications, the drawings, and the claims are incorporated herein by reference in their entirety.

BACKGROUND

A configuration of an antenna module may include a bent dielectric substrate is disclosed. In the antenna module, radiating elements are disposed on two surfaces whose normal directions are different.

SUMMARY

An antenna module according to the present disclosure includes a first substrate at which a first radiating element with a flat plate shape is disposed, and a second substrate at which a second radiating element is disposed. The first substrate has a first surface and a second surface that are opposite each other. The first radiating element is disposed on the second surface of the first substrate or at a position between the first surface and the second surface of the first substrate. The second substrate includes a first region that is arranged so as to abut the first substrate between the first surface of the first substrate and the second surface of the first substrate and a second region that is in contact with the first surface of the first substrate. A normal direction of the second radiating element is different from a normal direction of the first radiating element.

A kit for an antenna module according to the present disclosure includes a first substrate, and a second substrate. The first substrate includes an upper main surface and a lower main surface. A first connecting electrode is mounted on the upper main surface, a first radiating element is mounted on the lower main surface, and a recess is formed in the first substrate. The second substrate includes a first portion and a second portion. A second radiating element is mounted on the first portion, a second connecting electrode is mounted on the second portion, and a width of the first portion is smaller than width of the recess.

A method for assembling an antenna module according to the present disclosure includes obtaining a first substrate including an upper main surface and a lower main surface, wherein a first connecting electrode is mounted on the upper main surface, a first radiating element is mounted on the lower main surface, and a recess is formed in the first substrate; obtaining a second substrate including a first portion and a second portion, wherein a second radiating element is mounted on the first portion, a second connecting electrode is mounted on the second portion, and a width of the first portion is smaller than width of the recess; mounting the second substrate onto the first substrate such that the first portion fits to the recess; and connecting the first connecting electrode and the second connecting electrode.

DESCRIPTION OF EXEMPLARY EMBODIMENTS

Figure 1:
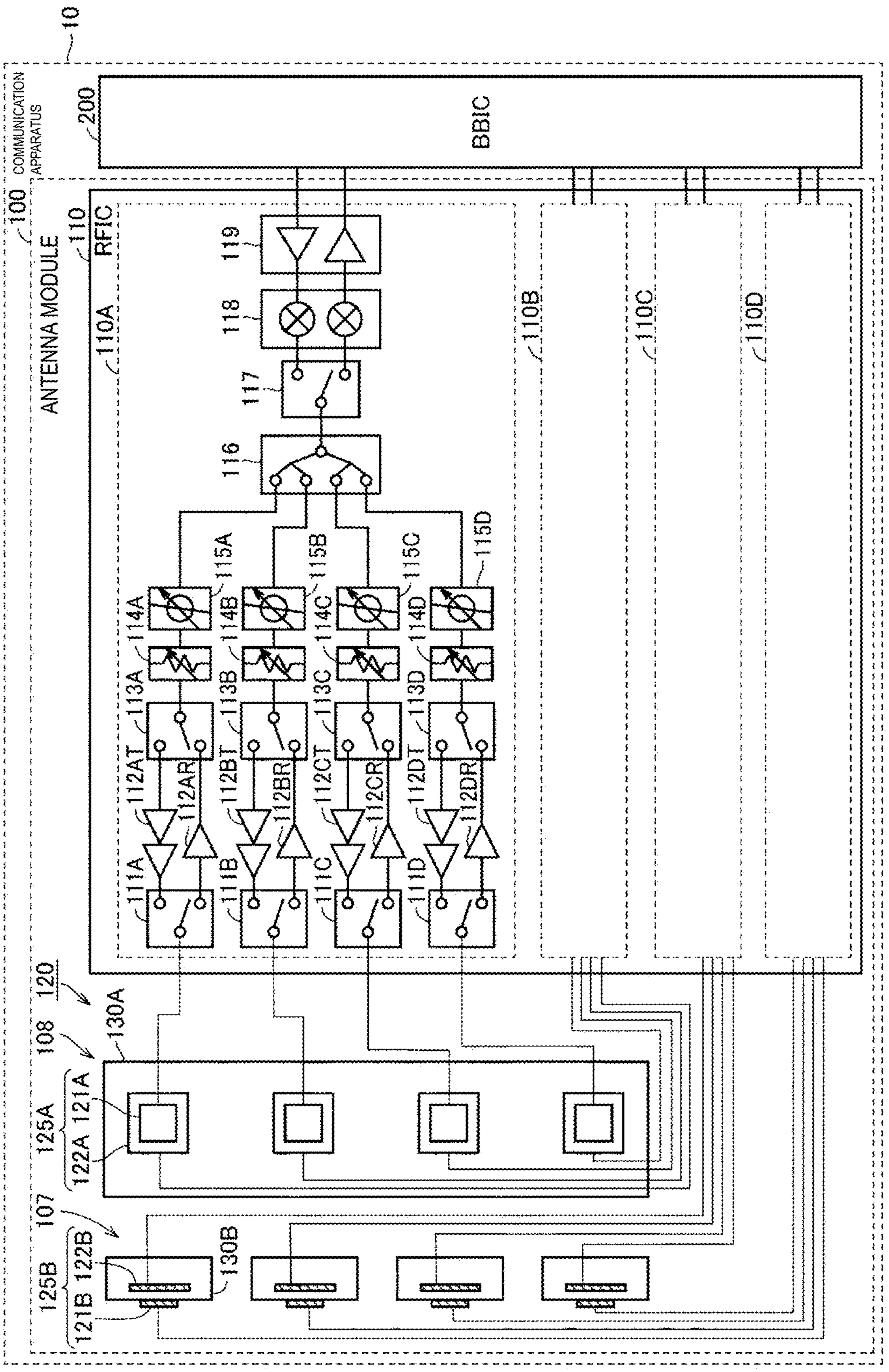
FIG. 1 is a block diagram of a communication apparatus in which an antenna module according to a first exemplary embodiment is used.

The present disclosure relates to an antenna module, and more particularly, to a technique for reducing the size of an antenna module capable of radiating radio waves in two directions.

The antenna module may be used in, for example, communication apparatuses represented by portable terminals such as cellular phones or smartphones. Further reductions in size and thickness of such communication apparatuses have been desired, and further reductions in size and height of antenna modules mounted on such communication apparatuses have also been required.

Meanwhile, if a further reduction in the height in the configuration including the bent dielectric substrate is made, a mechanical strength of the bent part may be deteriorated and a difficulty may arise in power supply via the bent part.

The present disclosure has been designed in light of this and an aspect of the present disclosure includes reducing the height of an antenna module capable of radiating radio waves in two directions while maintaining the mechanical strength of the antenna module.

In the antenna module according to the present disclosure, in a recessed part formed at a first substrate at which a first radiating element is disposed, a second substrate at which a second radiating element whose radiation direction (normal direction) is different is disposed is fitted, and the second substrate is fixed on a main surface (first surface) of the first substrate. With this arrangement, the two substrates can be fixed to each other without a bent part being provided. Thus, a reduction in the height of an antenna module capable of radiating radio waves in two directions can be achieved while ensuring the mechanical strength.

Hereinafter, exemplary embodiments of the present disclosure will be described in detail with reference to drawings. In the drawings, the same or corresponding parts are denoted by the same signs, and repetitive description of those parts will not be provided.

First Exemplary Embodiment (Basic Configuration of Communication Apparatus)

FIG. 1 is a block diagram of a communication apparatus 10 in which an antenna module 100 according to an exemplary embodiment is used. The communication apparatus 10 is, for example, a portable terminal such as a cellular phone, a smartphone, or a tablet, a personal computer provided with a communication function, or the like. For example, radio waves in a millimeter wave band with a center frequency of 28 GHz, 39 GHz, 60 GHz, or the like are used for the antenna module 100 according to this exemplary embodiment. However, radio waves in other frequency ranges may also be used.

Referring to FIG. 1, the communication apparatus 10 includes the antenna module 100 and a BBIC 200 including a baseband signal processing circuit. The antenna module 100 includes an RFIC 110, which is an example of a power feed device, and an antenna device 120. In the communication apparatus 10, a signal transmitted from the BBIC 200 to the antenna module 100 is up-converted into a high frequency signal and the high frequency signal is radiated from the antenna device 120. In the communication apparatus 10, a high frequency signal received by the antenna device 120 is also down-converted and is processed by the BBIC 200.

The antenna device 120 includes a dielectric substrate 130A and a plurality of dielectric substrates 130B. A plurality of radiating elements 125A are disposed at the dielectric substrate 130A. Each of the radiating elements 125A includes radiating electrodes 121A and 122A with a flat plate shape. A radiating element 125B is disposed at each of the dielectric substrates 130B. The radiating element 125B includes radiating electrodes 121B and 122B with a flat plate shape.

Each of the radiating electrodes included in each of the radiating elements 125A and 125B is a flat-plate-shaped patch antenna with a circular shape, an oval shape, or a polygonal shape. In an example of the first exemplary embodiment, each of the radiating electrodes is a microstrip antenna with a substantially square shape. In the radiating elements 125A, the radiating electrodes 121A are smaller in size than the radiating electrodes 122A. Thus, the frequency range of radio waves radiated from the radiating electrodes 121A is higher than the frequency range of radio waves radiated from the radiating electrodes 122A. Similarly, in the radiating elements 125B, the radiating electrodes 121B are smaller in size than the radiating electrodes 122B, and the frequency range of radio waves radiated from the radiating electrodes 121B is higher than the frequency range of radio waves radiated from the radiating electrodes 122B. That is, the antenna module 100 in the example of FIG. 1 is an antenna module of a so-called dual band type that is capable of radiating radio waves in different two frequency ranges from each of the two dielectric substrates 130A and 130B.

In the description provided below, the dielectric substrate 130A at which the plurality of radiating elements 125A are disposed will also be referred to as a "main substrate 108" and the individual dielectric substrates 130B at which the radiating elements 125B are disposed will also be referred to as "antenna blocks 107". As described later with reference to FIG. 2, the antenna device 120 is configured such that the plurality of antenna blocks 107 are attached to the main substrate 108.

In FIG. 1, an example in which the antenna device 120 includes four dielectric substrates 130B and four radiating elements 125A are disposed at the dielectric substrate 130A is illustrated. However, the number of dielectric substrates 130B and the number of radiating elements 125A are not limit to the numbers mentioned above. Furthermore, in FIG. 1, an example in which the radiating elements 125A are arranged in a one-dimensional array in such a manner that they are arranged in a line on the dielectric substrate 130A is illustrated. However, the radiating elements 125A may be arranged in a two-dimensional array on the dielectric substrate 130A. Alternatively, a single radiating element 125A may be arranged on the dielectric substrate 130A.

The RFIC 110 includes four power feed circuits 110A to 110D. The power feed circuit 110A is a circuit for supplying a high frequency signal to the radiating electrodes 121A at the main substrate 108. The power feed circuit 110B is a circuit for supplying a high frequency signal to the radiating electrodes 122A at the main substrate 108. The power feed circuit 110C is a circuit for supplying a high frequency signal to the radiating electrodes 122B at the antenna blocks 107. The power feed circuit 110D is a circuit for supplying a high frequency signal to the radiating electrodes 121B at the antenna blocks 107. The power feed circuits 110A to 110D have the same internal configurations. Therefore, in FIG. 1, for an easier explanation, a detailed configuration of only the power feed circuit 110A is illustrated, and configurations of the power feed circuits 110B to 110D are omitted. Hereinafter, a function of the power feed circuit 110A will be described on behalf of the power feed circuits.

The power feed circuit 110A includes switches 111A to 111D, 113A to 113D, and 117, power amplifiers 112AT to 112DT, low noise amplifiers 112AR to 112DR, attenuators 114A to 114D, phase shifters 115A to 115D, a signal combiner/splitter 116, a mixer 118, and an amplifier circuit 119.

For transmission of a high frequency signal, the switches 111A to 111D and 113A to 113D are switched to the power amplifiers 112AT to 112DT side, and the switch 117 is connected to a transmission-side amplifier in the amplifier circuit 119. For reception of a high frequency signal, the switches 111A to 111D and 113A to 113D are switched to the low noise amplifiers 112AR to 112DR side, and the switch 117 is connected to a reception-side amplifier in the amplifier circuit 119.

A signal at an intermediate frequency transmitted from the BBIC 200 is amplified by the amplifier circuit 119 and is up-converted by the mixer 118. A transmission signal, which is the up-converted high frequency signal, is split into four waves by the signal combiner/splitter 116. The split waves flow through corresponding signal paths, and power is fed to different radiating electrodes 121A. By individually adjusting the degrees of phase shift of the phase shifters 115A to 115D disposed at the signal paths, directivity of radio waves output from the radiating electrodes 121A can be adjusted.

Reception signals, which are high frequency signals received at the radiating electrodes 121A, are transmitted to the power feed circuit 110A in the RFIC 110, flow through different four signal paths, and are combined at the signal combiner/splitter 116. The combined reception signal is down-converted by the mixer 118, is further amplified by the amplifier circuit 119, and is transmitted to the BBIC 200.

The RFIC 110 is, for example, formed as a one-chip integrated circuit component including the circuit configurations described above. Alternatively, an individual integrated circuit component may be formed for each power feed circuit. Furthermore, as devices (switches, a power amplifier, a low noise amplifier, an attenuator, and a phase shifter) corresponding to each radiating element, a one-chip integrated circuit component may be formed for the corresponding radiating element.

(Structure of Antenna Module)

Figure 2:
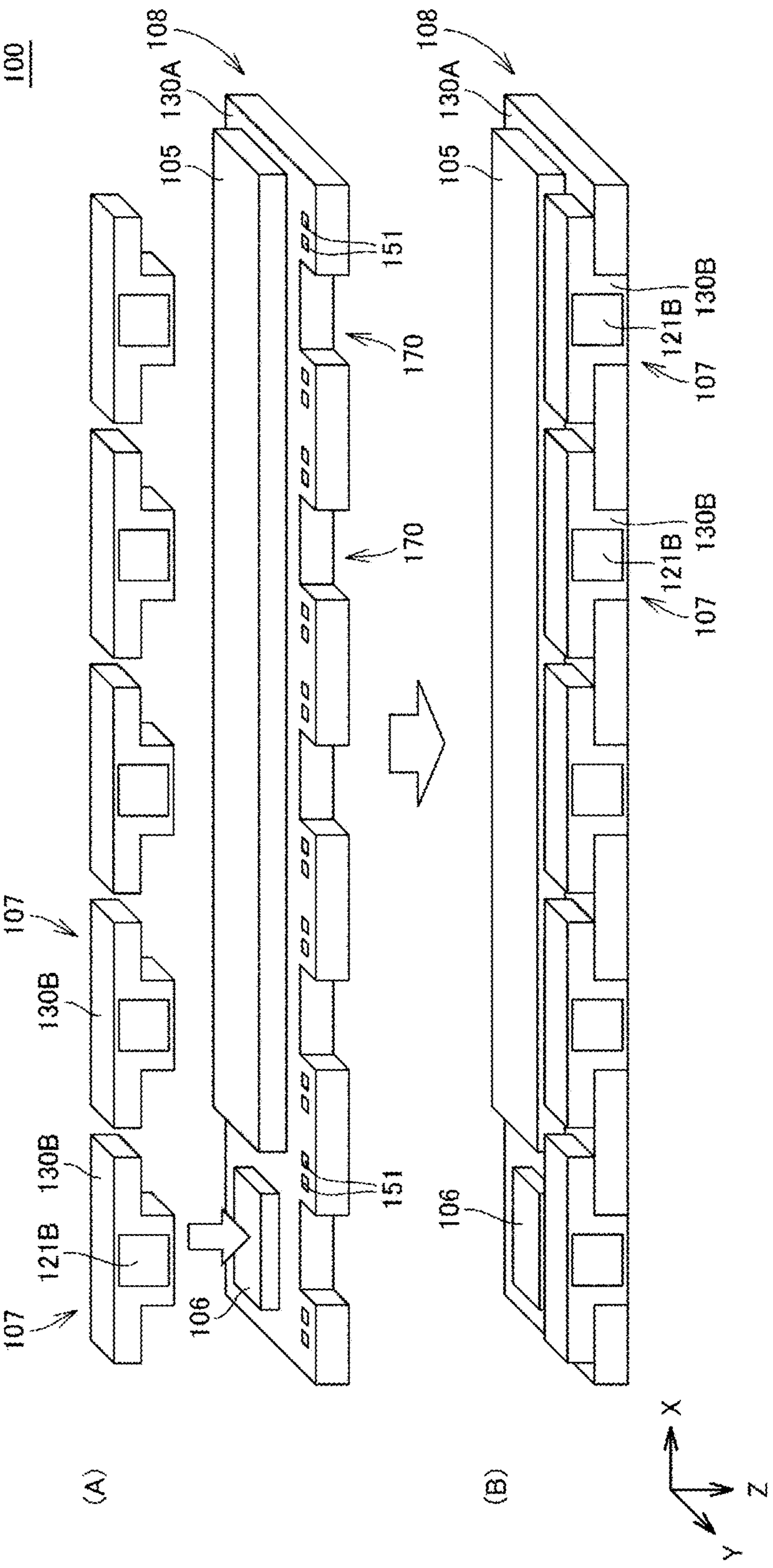
FIG. 2 is a perspective view of the antenna module of FIG. 1.
Figure 3:
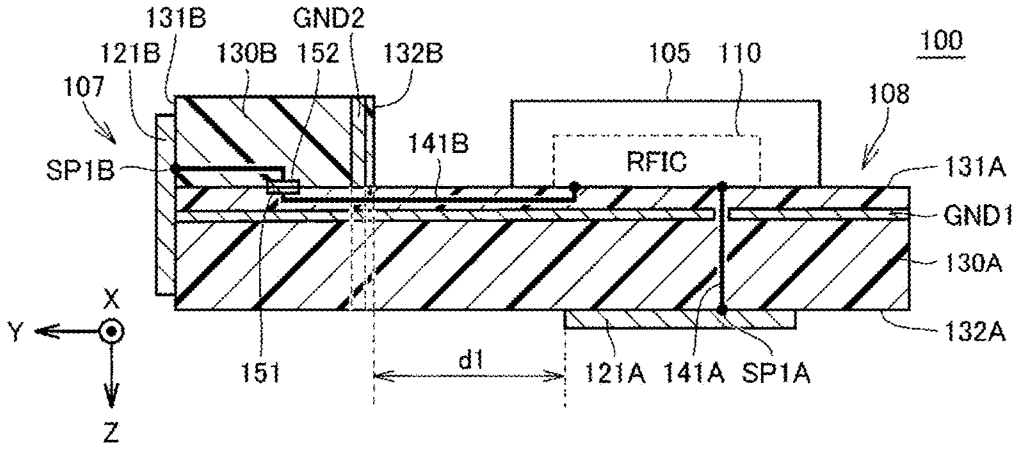
FIG. 3 is a perspective side view of the antenna module of FIG. 1.
Figure 4:
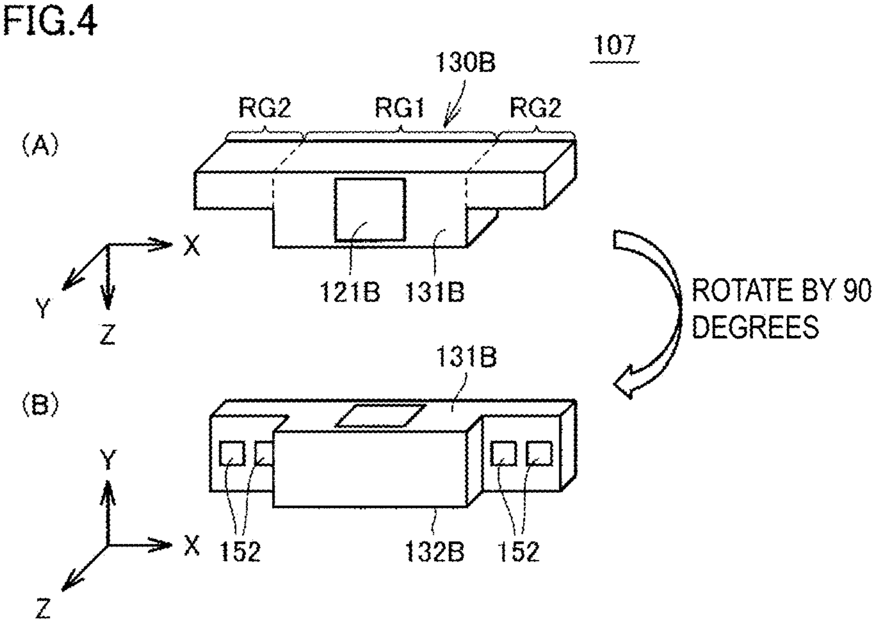
FIG. 4 is a diagram for explaining an antenna block.

Next, a configuration of the antenna module 100 according to the first exemplary embodiment will be described in detail with reference to FIGS. 2 to 4. FIG. 2 is a perspective view of the antenna module 100 according to the first exemplary embodiment. In an upper part (A) of FIG. 2, a state in which the main substrate 108 and the antenna blocks 107 are separated from each other is illustrated. In a lower part (B) of FIG. 2, a state in which the antenna blocks 107 are attached to the main substrate 108 is illustrated. FIG. 3 is a perspective side view of the antenna module 100 in the state illustrated in (B) of FIG. 2 when seen from an X-axis positive direction. FIG. 4 is a perspective view of a single antenna block 107. An upper part (A) of FIG. 4 is a perspective view of the antenna block 107 in the case where a surface in a Y-axis direction of the antenna block 107 faces front. A lower part (B) of FIG. 4 is a perspective view of the antenna block 107 in the case where a surface in a Z-axis direction of the antenna block 107 faces front.

In FIGS. 2 to 4, for an easier explanation, a case where a radiating element 125A includes a single radiating electrode 121A and a radiating element 125B includes a single radiating electrode 121B is described. Furthermore, in FIGS. 2 to 4, five radiating elements are disposed at the dielectric substrate 130A and five antenna blocks 107 are provided accordingly.

Referring to FIGS. 2 to 4, the antenna module 100 further includes power feed wires 141A and 141B, connection electrodes 151 and 152, and ground electrodes GND1 and GND2, in addition to the dielectric substrates 130A and 130B, the radiating electrodes 121A and 121B, and the RFIC 110. In the description provided below, a normal direction of a main surface of the dielectric substrate 130A is defined as the Z-axis direction. Furthermore, on the main surface of the dielectric substrate 130A, a direction in which the radiating electrodes 121A and the antenna blocks 107 are arranged is defined as the X axis, and a direction orthogonal to the X axis is defined as the Y axis. In other words, a direction in which radio waves are radiated from the radiating electrodes 121A is defined as a Z-axis positive direction, and a direction in which radio waves are radiated from the radiating electrodes 121B is defined as a Y-axis positive direction. That is, the normal direction of the radiating electrodes 121A and the normal direction of the radiating electrodes 121B are orthogonal to each other.

Each of the dielectric substrates 130A and 130B is, for example, a low temperature co-fired ceramic (LTCC) multilayer substrate, a multilayer resin substrate formed by laminating multiple resin layers made of resin such as epoxy or polyimide, a multilayer resin substrate formed by laminating multiple resin layers made of liquid crystal polymer (LCP) having a lower permittivity, a multilayer resin substrate formed by laminating multiple resin layers made of fluorine-based resin, a multilayer resin substrate formed by laminating multiple resin layers made of a polyethylene terephthalate (PET) material, or a ceramic multilayer substrate made of a material other than LTCC. Each of the dielectric substrates 130A and 130B does not necessarily have a multilayer structure and may be a single-layer substrate.

The dielectric substrate 130A has a substantially rectangular shape with long sides in the X-axis direction when seen in a plan view from the Z-axis direction. A plurality of recessed parts (notched parts) 170 are formed at one long side along the X axis (end portion in the Y-axis positive direction) of the dielectric substrate 130A. The recessed parts 170 are formed up to a side surface (end portion) in the Y-axis positive direction of the dielectric substrate 130A and penetrate through the dielectric substrate 130A in the Z-axis direction. The antenna blocks 107 are partially fitted in and fixed into recesses of the recessed parts 170. The recessed parts 170 do not necessarily penetrate through the dielectric substrate 130A in the Z-axis direction as illustrated in FIG. 2. The recessed parts 170 only need to be recessed in the Z-axis direction from a main surface 131A. Furthermore, the recessed parts 170 are not necessarily located in the end portion of the dielectric substrate 130A.

The connection electrodes 151 with a flat plate shape are disposed in parts of the main surface 131A that are in contact with the antenna blocks 107. The connection electrodes 151 are used for electrical connection between the antenna blocks 107 and the main substrate 108.

The dielectric substrate 130A has a main surface 132A located in the Z-axis positive direction and the main surface 131A located in a Z-axis negative direction. The plurality of radiating electrodes 121A are arranged in a line in the X-axis direction on the main surface 132A of the dielectric substrate 130A or at positions inside the dielectric substrate 130A that are near the main surface 132A. A system in package (SiP) module 105 including the RFIC 110, a power module IC (not illustrated in drawings), and the like and a connector 106 used for connection with an external apparatus are mounted on the main surface 131A. Furthermore, in a layer of the dielectric substrate 130A between the radiating electrode 121A and the main surface 131A, the ground electrode GND1 that is opposite the entire radiating electrode 121A is disposed.

A high frequency signal is supplied from the RFIC 110 via the power feed wire 141A to each of the radiating electrodes 121A. Inside the dielectric substrate 130A, the power feed wire 141A penetrates through the ground electrode GND1 and is connected to a power feed point SP1A of the radiating electrode 121A. In the example of FIG. 3, the power feed point SP1A is arranged at a position offset in the Y-axis negative direction from the center of the radiating electrode 121A. Thus, a radio wave that is polarized in the Y-axis direction is radiated in the Z-axis positive direction from the radiating electrode 121A.

As illustrated in FIG. 4, the dielectric substrate 130B includes a center region RG1 in which the radiating electrode 121B is disposed and regions RG2 that project out in the X-axis positive and negative directions from the region RG1. The dimension in the Z-axis direction of the regions RG2 is shorter than the dimension in the Z-axis direction of the region RG1. That is, the dielectric substrate 130B has a substantially T shape when seen in a plan view from the Y-axis direction. As illustrated in FIG. 2, the dielectric substrate 130B is arranged in such a manner that the region RG1 fits into the recessed part 170 of the dielectric substrate 130A and a surface of the regions RG2 in the Z-axis positive direction is in contact with the main surface 131A of the dielectric substrate 130A.

As illustrated in FIG. 3, the radiating electrode 121B is disposed on a main surface 131B in the Y-axis positive direction of the dielectric substrate 130B. Furthermore, at a position in the dielectric substrate 130B that is near a main surface 132B in the Y-axis negative direction, the ground electrode GND2 that is opposite the radiating electrode 121B is disposed over the region RG1.

The connection electrode 152 with a flat plate shape is disposed on the surface in the Z-axis positive direction of the region RG2 of the dielectric substrate 130B. The connection electrode 152 is disposed at a position that is in contact with the connection electrode 151, which is disposed on the main surface 131A of the main substrate 108, in the state in which the antenna block 107 is fitted in the main substrate 108. For example, the connection electrode 151 and the connection electrode 152 are electrically connected by soldering. Electrical coupling between the connection electrode 151 and the connection electrode 152 is not necessarily direct connection and may be capacitance coupling without contact between the electrodes.

A high frequency signal is transmitted from the RFIC 110 via the power feed wire 141B to the radiating electrode 121B at the antenna block 107. The power feed wire 141B extends from the RFIC 110 and is connected through the dielectric substrate 130A, the connection electrodes 151 and 152, and the dielectric substrate 130B to a power feed point SP1B of the radiating electrode 121B. In the example of FIG. 3, the power feed point SP1B is arranged at a position offset in the Z-axis negative direction from the center of the radiating electrode 121B. Thus, a radio wave that is polarized in the Z-axis direction is radiated in the Y-axis positive direction from the radiating electrode 121B.

In the antenna module 100 according to the first exemplary embodiment, the antenna block 107 is disposed at a position that is away from the radiating electrode 121A at the main substrate 108 in the Y-axis direction by a distance d1. Radio waves can be radiated toward two directions when the distance d1 is set to at least 0.05λ or more, where the wavelength of a radio wave radiated from the radiating electrode 121A is represented by λ. The main surface 131B of the dielectric substrate 130B does not project from the end portion in the Y-axis positive direction of the dielectric substrate 130A. In other words, when the dielectric substrate 130A is seen in a plan view from the normal direction (Z-axis direction), the dielectric substrate 130B is disposed to be more inward than the outermost peripheral end portion of the dielectric substrate 130A.

In the case where an antenna module capable of radiating radio waves in two directions is implemented using a bent dielectric substrate as described above, an amount of projection of one substrate part that is bent from the other substrate is likely to be large. Thus, constraints on the dimensions may arise in the case where a further reduction in height is made. Furthermore, a position and a number of bent parts connecting the two substrate surfaces is restricted, and a dielectric thickness of the bent part also needs to be reduced. Therefore, the mechanical strength of the bent part may be insufficient. In the case where a plurality of radiating electrodes is used, a situation in which a passage route for a power feed wire is not ensured may occur.

In contrast, in the antenna module 100 according to the first exemplary embodiment, by using the antenna block 107 in which one radiating electrode 121B is disposed at another dielectric substrate 130B, the antenna block 107 is fitted in the recessed part 170 of the main substrate 108 and the antenna block 107 is fixed on the main surface 131A of the main substrate 108. Thus, the two dielectric substrates 130A and 130B are fixed to overlap with surfaces thereof in contact with each other. Therefore, a further reduction in the height can be achieved, and mechanical strength can be ensured.

Furthermore, since the antenna block 107 can be configured as a separate dielectric substrate, the dielectric thickness (that is, the distance between the radiating electrode 121B and the ground electrode GND2) can be ensured. Consequently, antenna characteristics such as a frequency range of radiated radio waves can be improved. In particular, by increasing the permittivity of the dielectric substrate 130B to be higher than the permittivity of the dielectric substrate 130A, the entire size of the radiating electrode 121B and the antenna block 107 can be reduced compared to the case where dielectric substrates with the same permittivity are used. Therefore, further reductions in the height and the size can be achieved.

In FIGS. 2 to 4 mentioned above, a configuration of an antenna module of a single band type in which only the radiating electrodes 121A and 121B are arranged as radiating elements is described for the purpose of easier explanation. However, a similar configuration is applicable to a configuration of a dual band type in which radiating electrodes of different sizes are stacked on each dielectric substrate as in FIG. 1. Furthermore, the configuration mentioned above is also applicable to an antenna module of a dual polarization type capable of radiating radio waves in different two polarization directions from each radiating electrode.

A "radiating element 125A" and a "radiating element 125B" in the first exemplary embodiment correspond to a "first radiating element" and a "second radiating element" in the present disclosure, respectively. A "radiating electrode 121A" and a "radiating electrode 122A" in the first exemplary embodiment correspond to a "first element" and a "second element" in the present disclosure, respectively. A "radiating electrode 121B" and a "radiating electrode 122B" in the first exemplary embodiment correspond to a "third element" and a "fourth element" in the present disclosure, respectively.

In the first exemplary embodiment, in the case of an array antenna, one of adjacent radiating elements 125A corresponds to a "first radiating element" in the present disclosure, and the other one of the adjacent radiating elements 125A corresponds to a "third radiating element" in the present disclosure. Similarly, one of adjacent radiating elements 125B corresponds to a "second radiating element" in the present disclosure, and the other one of the adjacent radiating elements 125B corresponds to a "fourth radiating element" in the present disclosure. The "X-axis direction" in the first exemplary embodiment corresponds to a "first direction" and a "second direction" in the present disclosure. The "Y-axis direction" in the first exemplary embodiment corresponds to a "third direction" in the present disclosure.

The "dielectric substrate 130A" and the "dielectric substrate 130B" in the first exemplary embodiment correspond to a "first substrate" and a "second substrate" in the present disclosure, respectively. The "main surface 131A" and the "main surface 132A" in the first exemplary embodiment correspond to a "first surface" and a "second surface" in the present disclosure, respectively. The "regions RG1 and RG2" in the first exemplary embodiment correspond to a "first region" and a "second region" in the present disclosure, respectively. The "ground electrodes GND1 and GND2" in the first exemplary embodiment correspond to a "first ground electrode" and a "second ground electrode" in the present disclosure, respectively.

Modification

Figure 5:
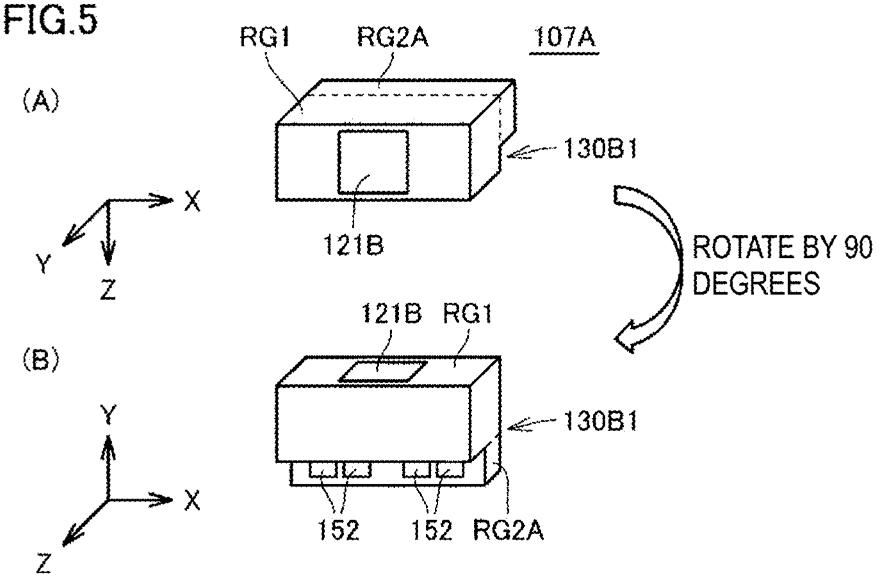
FIG. 5 is a diagram for explaining an antenna block according to a modification.

In a modification, another configuration of an antenna block will be described. FIG. 5 is a diagram for explaining an antenna block 107A in the modification. As in FIG. 4, an upper part (A) of FIG. 5 is a perspective view of the antenna block 107A in the case where a surface in the Y-axis direction of the antenna block 107A faces front, and a lower part (B) of FIG. 5 is a perspective view of the antenna block 107A in the case where a surface in the Z-axis direction of the antenna block 107A faces front.

Referring to FIG. 5, the antenna block 107A is different from the antenna block 107 in FIG. 4 in the configuration of the region RG2 for fixing the antenna block 107A onto the main surface 131A of the main substrate 108. More specifically, a dielectric substrate 130B1 includes, in place of the region RG2 of the antenna block 107, a region RG2A that projects out from a rear surface (that is, a main surface in the Y-axis negative direction) of the region RG1 in which the radiating electrode 121B is disposed. In other words, the dielectric substrate 130B1 has a substantially L shape when seen in a plan view from the X-axis direction. The connection electrode 152 is disposed on a surface in the Z-axis positive direction of the region RG2A.

When the antenna block 107A is disposed at the main substrate 108 illustrated in FIG. 2, the region RG2A is fixed onto the dielectric substrate 130A at a position on the main surface 131A in a region between the recessed part 170 and the Sip 105.

Also, in the case where the antenna block 107A according to the modification is used, a reduction in the height can be achieved while mechanical strength being ensured, as in the first exemplary embodiment.

The "dielectric substrate 130B1" in the modification corresponds to a "second substrate" in the present disclosure.

Second Exemplary Embodiment

In a second exemplary embodiment, a configuration in which the antenna blocks 107 are disposed at positions of the main substrate 108 that are different from those described above will be described.

Figure 6:
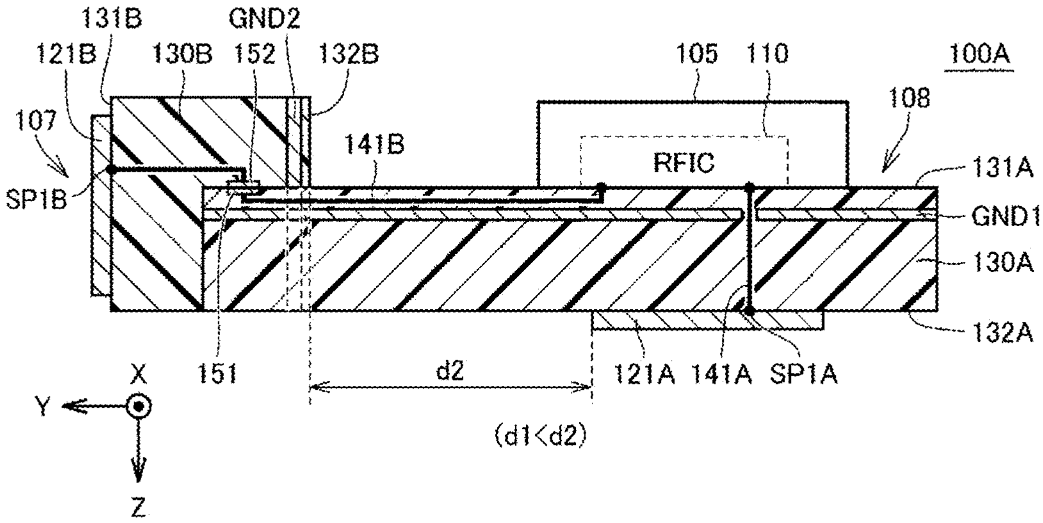
FIG. 6 is a perspective side view of an antenna module according to a second exemplary embodiment.

FIG. 6 is a perspective side view of an antenna module 100A according to the second exemplary embodiment. The antenna module 100A is different from the antenna module 100 according to the first exemplary embodiment in that the antenna blocks 107 are disposed at positions of the main substrate 108 that overhang out of the main substrate 108. In FIG. 6, repetitive description of the same configurations as those of the antenna module 100 according to the first exemplary embodiment will not be provided.

Referring to FIG. 6, the antenna block 107 in the antenna module 100A is disposed at a position that is away from the radiating electrode 121A in the Y-axis positive direction by d2 (>d1). Thus, part of the dielectric substrate 130B projects in the Y-axis positive direction from an end portion in the Y-axis positive direction (that is, the outermost peripheral end portion) of the dielectric substrate 130A.

The ground electrode GND2 is disposed at the dielectric substrate 130B. Thus, if the distance between the radiating electrode 121A and the dielectric substrate 130B is short, regarding a radio wave polarized in the Y-axis direction traveling from the radiating electrode 121A toward the dielectric substrate 130B, a line of electric force generated from the radiating electrode 121A interferes with the ground electrode GND2, which may impact the antenna characteristics.

In such a case, as in the antenna module 100A according to the second exemplary embodiment, by arranging part of the antenna block 107 so as to project out from the main substrate 108 so that the separation distance between the radiating electrode 121A and the ground electrode GND2 can be ensured, a deterioration in the antenna characteristics of the radiating electrode 121A can be suppressed.

Figure 7:
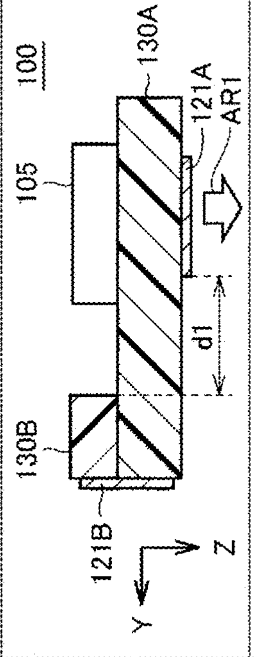
FIG. 7 is a diagram for explaining antenna characteristics of a radiating element at a main substrate of the antenna modules according to the first exemplary embodiment and the second exemplary embodiment.
Figure 7:
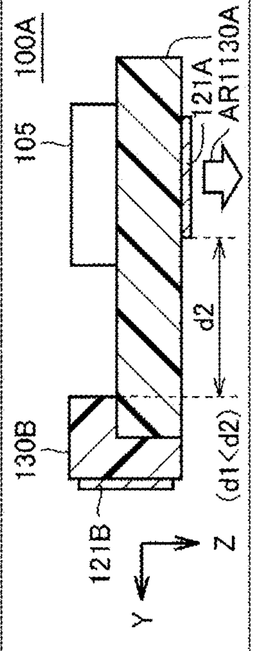
Figure 7:
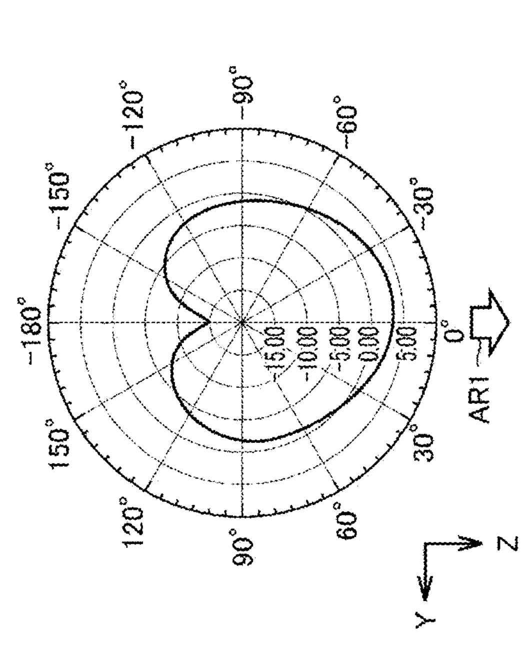
Figure 7:
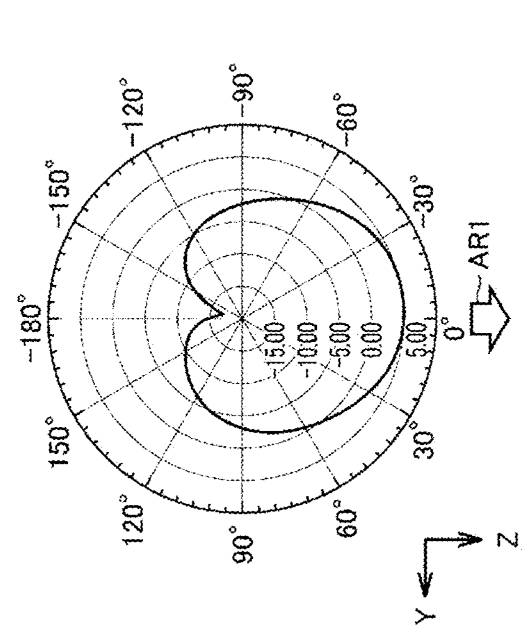

FIG. 7 is a diagram for explaining antenna characteristics of the radiating electrode 121A at the main substrate 108 in the antenna module 100 according to the first exemplary embodiment and in the antenna module 100A according to the second exemplary embodiment. In FIG. 7, for the first exemplary embodiment (left column) and the second exemplary embodiment (right column), schematic configuration diagrams of antenna modules (upper part), graphs of antenna gain of the radiating electrodes 121A (middle part), and the values of peak gain in the Z-axis direction (lower part) are illustrated. Radio waves are radiated in the Z-axis positive direction (direction of arrow AR1 in FIG. 7) from the radiating electrodes 121A. In the example of FIG. 7, d1 is 0.44 [mm] and d2 is 0.94 [mm].

As illustrated in FIG. 7, the peak gain in the first exemplary embodiment is 3.28 [dBi]. In contrast, in the second exemplary embodiment, the peak gain is 5.16 [dBi]. The gain characteristics of the radiating electrode 121A are improved by increasing the distance between the radiating electrode 121A and the antenna block 107.

However, the dimension in the Y-axis direction of the antenna module 100A according to the second exemplary embodiment is larger than that of the antenna module 100. Thus, in terms of reducing size, an adverse effect is obtained. That is, there is a trade-off between antenna characteristics and reduction in size. Therefore, regarding which one of the configurations of the antenna modules 100 and 100A is to be adopted, an appropriate selection is made taking into consideration required specifications.

Third Exemplary Embodiment

In a third exemplary embodiment, a configuration for improving antenna characteristics of radiating elements at the antenna blocks 107 will be described.

Figure 8:
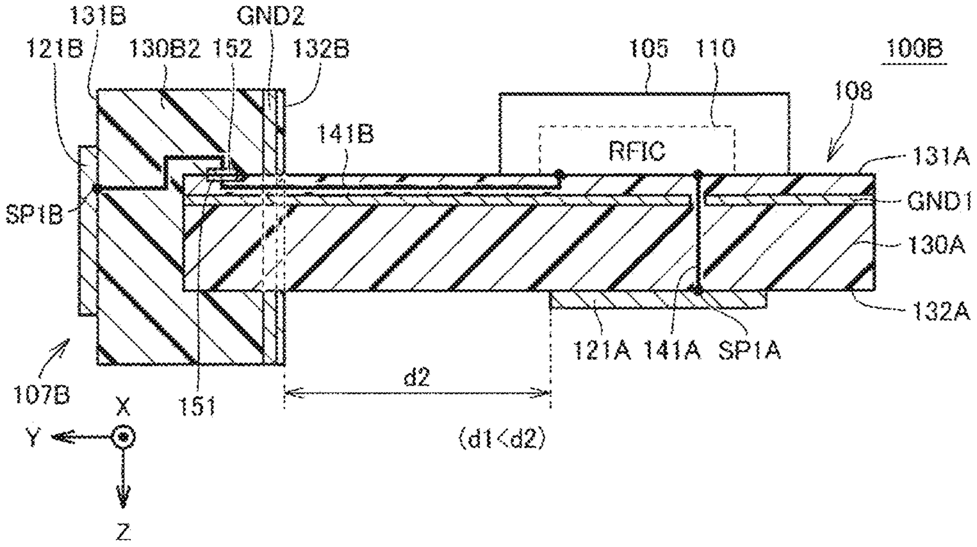
FIG. 8 is a perspective side view of an antenna module according to a third exemplary embodiment.

FIG. 8 is a perspective side view of an antenna module 100B according to the third exemplary embodiment. In the antenna module 100B, the antenna blocks 107A in the antenna module 100A according to the second exemplary embodiment are replaced by antenna blocks 107B. The other configurations of the antenna module 100B are similar to those of the antenna module 100A. In FIG. 8, repetitive description of the same configurations as those of the antenna module 100A according to the second exemplary embodiment will not be provided.

Referring to FIG. 8, in the antenna block 107B of the antenna module 100B, the dimension in the Z-axis direction of a dielectric substrate 130B2 is longer than that of the dielectric substrate 130B. Thus, the dimension in the Z-axis direction of the ground electrode GND2 also increases. The dielectric substrate 130B2 is arranged so as to project out in the Z-axis positive and negative directions from the dielectric substrate 130A. In other words, the dielectric substrate 130B2 projects out in the Z-axis direction, which is the normal direction, from the main surfaces 131A and 132A of the dielectric substrate 130A.

It is known that a patch antenna typically exhibits excellent antenna characteristics in the case where a ground electrode that is disposed opposite a radiating electrode has a sufficiently large area. If the area of a ground electrode is small, a line of electric force generated from a radiating electrode goes behind the ground electrode. Thus, a radiation component toward a side surface and a rear surface of a dielectric substrate increases, which may cause a reduction in the antenna gain.

In the antenna module according to the first exemplary embodiment, as illustrated in FIG. 4, in order to reduce the height, the dimension in the Z-axis direction of the dielectric substrate is extremely shorter than that in the X-axis direction. Thus, antenna characteristics for radio waves polarized in the Z-axis direction are likely to be deteriorated compared to that for radio waves polarized in the X-axis direction.

Thus, if antenna characteristics for radio waves polarized in the Z-axis direction do not satisfy desired required characteristics, by increasing the dimension in the Z-axis direction of the dielectric substrate 130B2 as in the antenna module 100B according to the third exemplary embodiment, the antenna characteristics can be adjusted.

However, in the case of the antenna module 100B according to the third exemplary embodiment, the dimension in the Z-axis direction of the entire antenna module 100B is larger than that of the antenna module 100A. Thus, in terms of reducing size, an adverse effect is obtained. Therefore, regarding which one of the configurations of the antenna modules 100A and 100B is to be adopted, an appropriate selection is made taking into consideration required specifications.

Figure 9:
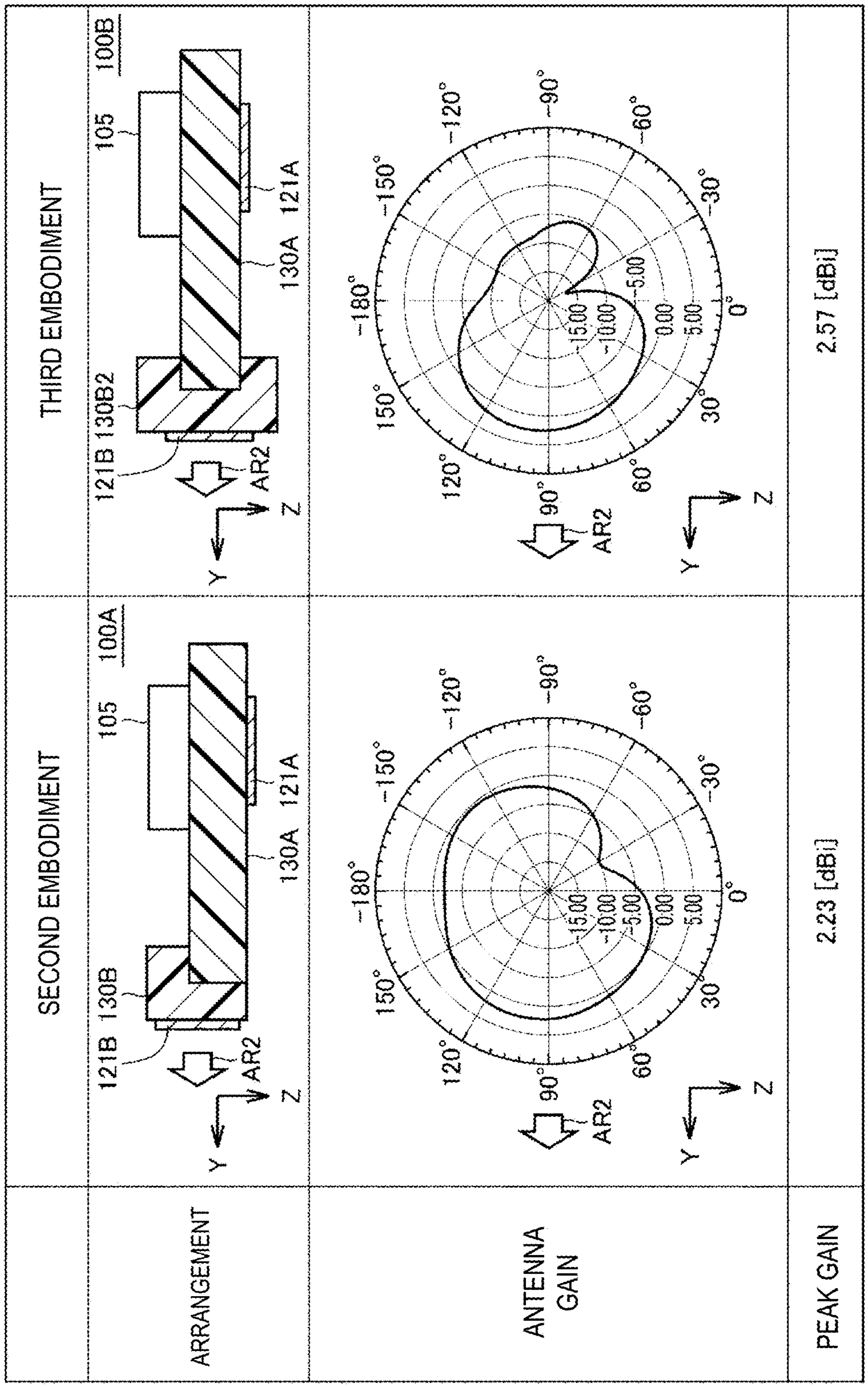
FIG. 9 is a diagram for explaining antenna characteristics of a radiating element at an antenna block of the antenna modules according to the second exemplary embodiment and the third exemplary embodiment.

FIG. 9 is a diagram for explaining antenna characteristics of the radiating element at the antenna block in the antenna module 100A according to the second exemplary embodiment and in the antenna module 100B according to the third exemplary embodiment. Also in FIG. 9, for the second exemplary embodiment (left column) and the third exemplary embodiment (right column), schematic configuration diagrams of antenna modules (upper part), graphs of antenna gain of the radiating electrodes 121B (middle part), and the values of peak gain in the Y-axis direction (lower part) are illustrated, as in FIG. 7. Radio waves are radiated in the Y-axis positive direction (direction of arrow AR2 in FIG. 9) from the radiating electrodes 121B.

As illustrated in FIG. 9, the peak gain in the second exemplary embodiment is 2.23 [dBi]. In contrast, in the third exemplary embodiment, the peak gain is 2.57 [dBi]. The gain characteristics of the radiating electrode 121B are improved by increasing the area of the ground electrode GND2 in the antenna block 107B toward the Z-axis direction.

Fourth Exemplary Embodiment

In a fourth exemplary embodiment, a configuration in which the direction of radio waves radiated from antenna blocks is different from that described above will be described.

Figure 10:
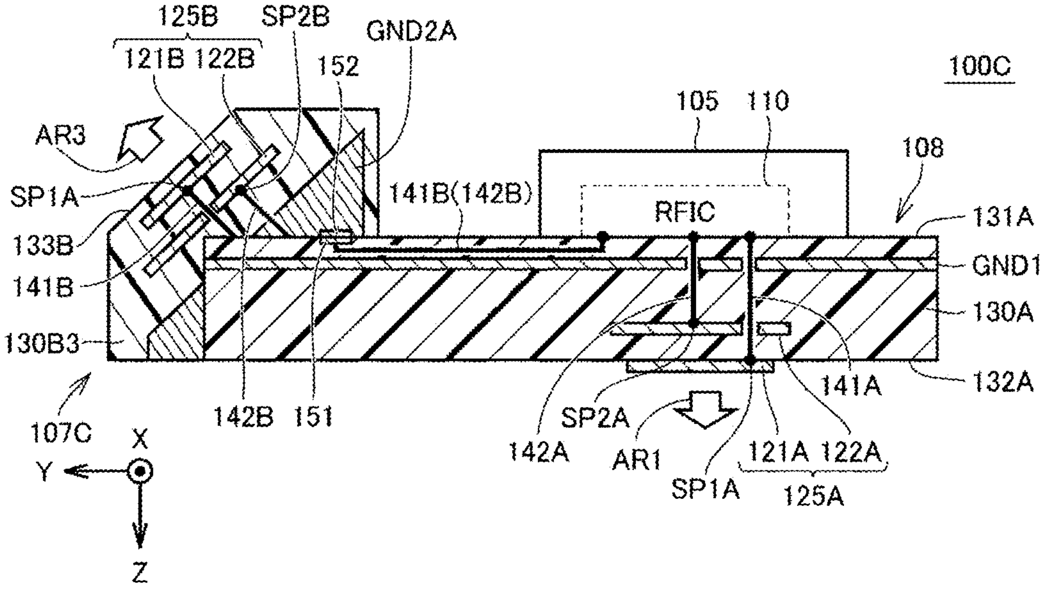
FIG. 10 is a perspective side view of an antenna module according to a fourth exemplary embodiment.

FIG. 10 is a perspective side view of an antenna module 100C according to a fourth exemplary embodiment. In the antenna module 100C, the antenna blocks 107 in the antenna module 100 according to the first exemplary embodiment are replaced by antenna blocks 107C. Furthermore, in the antenna module 100C, a radiating electrode 122A and a power feed wire 142A are added at the main substrate 108. The other configurations of the antenna module 100C are similar to those of the antenna module 100. In FIG. 10, repetitive description of the same elements as those of the antenna module 100 will not be provided.

Referring to FIG. 10, at the main substrate 108, the radiating electrode 122A is disposed opposite the radiating electrode 121A in a layer between the radiating electrode 121A and the ground electrode GND1 at the dielectric substrate 130A. A high frequency signal is transmitted from the RFIC 110 via the power feed wire 142A to the radiating electrode 122A. The power feed wire 142A extends from the RFIC 110, penetrates through the ground electrode GND1, and is connected to a power feed point SP2A of the radiating electrode 122A. Radio waves are radiated in the Z-axis positive direction indicated by the arrow AR1 from the radiating electrodes 121A and 122A.

The antenna block 107C includes a dielectric substrate 130B3, radiating electrodes 121B and 122B, and a ground electrode GND2A. The cross section of the dielectric substrate 130B3 has a shape obtained by cutting out part of corners of a rectangular shape when seen in a plan view from the X-axis direction. More specifically, the dielectric substrate 130B3 has a shape having a main surface 133B whose normal direction is an oblique direction between the Y-axis positive direction and the Z-axis negative direction.

At the dielectric substrate 130B3, the radiating electrodes 121B and 122B are arranged in parallel with the main surface 133B. Furthermore, the ground electrode GND2A is a metallic body with a surface that is in parallel with the main surface 133B. For example, the ground electrode GND2A may be configured such that a plurality of flat-plate electrodes that are in parallel with the main surface 133B are laminated and the plurality of flat-plate electrodes are connected by one or more vias. The radiating electrode 122B is disposed opposite the radiating electrode 121B between the radiating electrode 121B and the ground electrode GND2A.

A high frequency signal from the RFIC 110 is transmitted via the power feed wires 141B and 142B to the radiating electrodes 121B and 122B, respectively. The power feed wire 141B extends from the RFIC 110, passes through the dielectric substrate 130A and corresponding connection electrodes 151 and 152, penetrates through the ground electrode GND2A and the radiating electrode 122B inside the dielectric substrate 130B3, and is connected to the power feed point SP1B of the radiating electrode 121B. The power feed wire 142B extends from the RFIC 110, passes through the dielectric substrate 130A and corresponding connection electrodes 151 and 152, penetrates through the ground electrode GND2A inside the dielectric substrate 130B3, and is connected to the power feed point SP2B of the radiating electrode 122B.

With the arrangement described above, a radio wave is radiated in a direction indicated by arrow AR3 in FIG. 10 from the antenna block 107C. The angle formed between a radiation direction of radio waves radiated from the radiating element 125B (radiating electrodes 121B and 122B) at the antenna block 107C, that is, the normal direction of the radiating element 125B (arrow AR3), and the radiation direction of radio waves radiated from the radiating element 125A (radiating electrodes 121A and 122A) at the main substrate 108, that is, the normal direction of the radiating element 125A (arrow AR1), is larger than 90 degrees and smaller than 180 degrees. In the antenna module 100C, the coverage of radio waves radiated from the entire antenna module can be expanded compared to the antenna module 100 according to the first exemplary embodiment.

A recessed part may be formed in part of the region of the ground electrode GND2A that is opposite the radiating electrode 122B, so that the thickness of a dielectric layer between the radiating electrode 122B and the ground electrode GND2A can be increased. With this arrangement, the band width of radio waves radiated may be increased.

Fifth Exemplary Embodiment

In the antenna module 100 according to the first exemplary embodiment, a configuration in which the antenna blocks 107 are disposed along one long side of the dielectric substrate 130A and radio waves are radiated in one direction using the antenna blocks 107 is described. In a fifth exemplary embodiment, a configuration in which radio waves are radiated in two direction using antenna blocks will be described.

Figure 11:
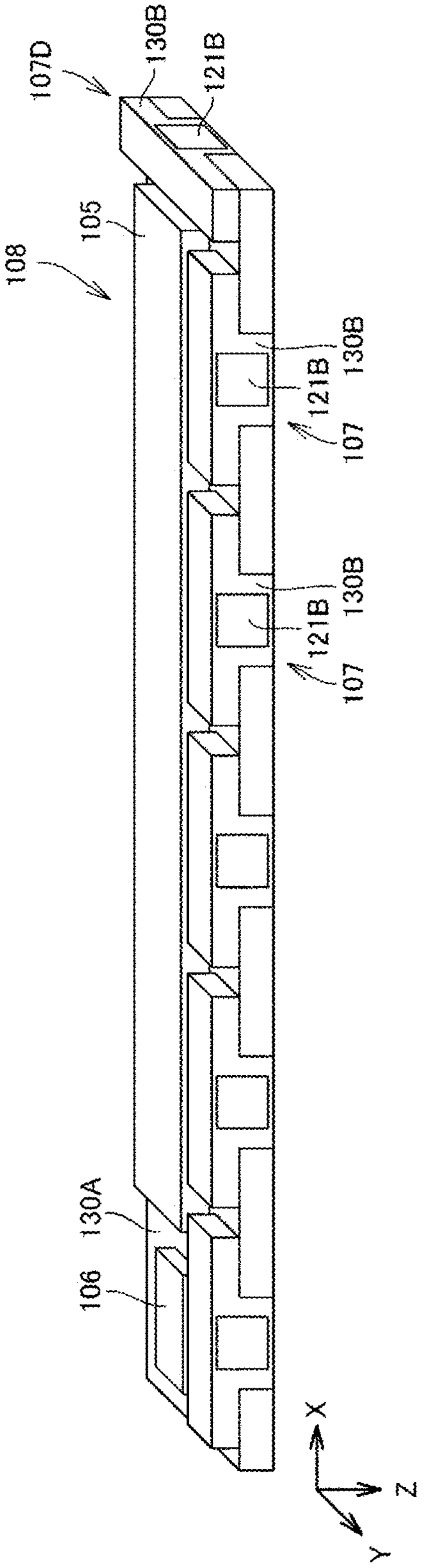
FIG. 11 is a perspective view of an antenna module according to a fifth exemplary embodiment.

FIG. 11 is a perspective view of an antenna module 100D according to the fifth exemplary embodiment. In the antenna module 100D, an antenna block 107D is further disposed in an end portion in the X-axis positive direction of the dielectric substrate 130A. That is, in addition to radiation of radio waves in the Y-axis and Z-axis positive directions, radiation of radio waves in the X-axis positive direction from the antenna block 107D can also be achieved.

In the example of the antenna module 100D, part of a high frequency signal to be supplied to the antenna blocks 107 is branched out and then supplied to the antenna block 107D. With this arrangement, radio waves can be radiated over a wider range. Therefore, total radiation power (TRP) can be maintained, an increase in the dimension in the X-axis direction of the dielectric substrate 130A can be suppressed, and equivalent isotopically radiated power (EIRP) and cumulative distribution function (CDF) of radiated power can be improved.

Modification

In a modification, a configuration in which an antenna block is further disposed in an end portion in the X-axis negative direction of the dielectric substrate 130A will be described.

Figure 12:
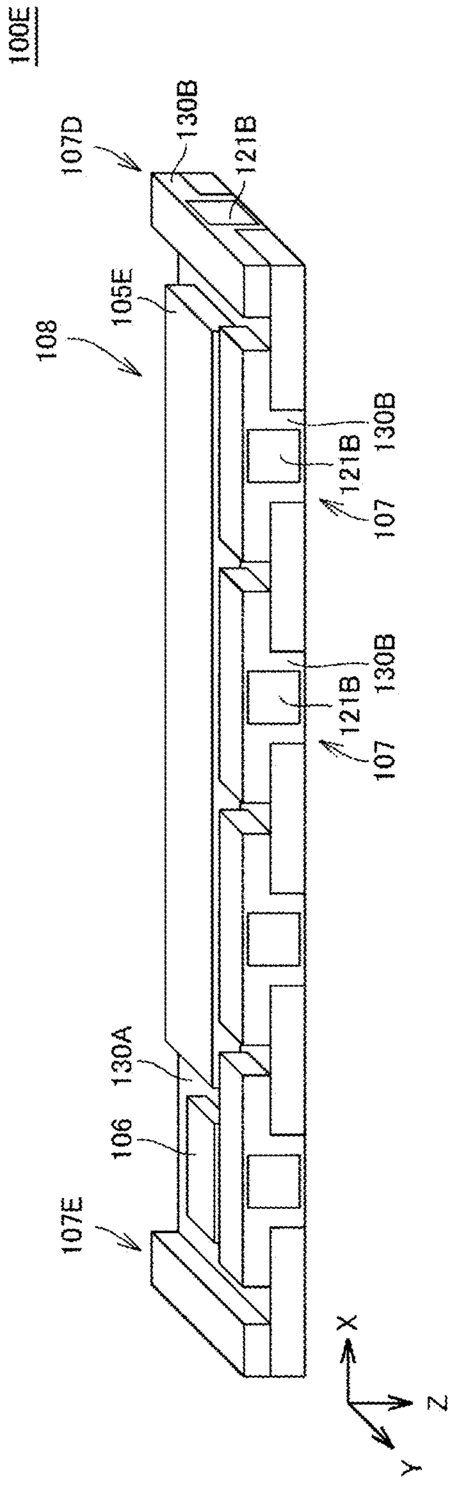
FIG. 12 is a perspective view of an antenna module according to a modification.

FIG. 12 is a perspective view of an antenna module 100E according to the modification. In the antenna module 100E, the antenna block 107D is disposed in the end portion in the X-axis positive direction of the dielectric substrate 130A as in the antenna module 100D according to the fifth exemplary embodiment, and an antenna block 107E is further disposed in an end portion in the X-axis negative direction. A radio wave is radiated in the X-axis negative direction from the antenna block 107E.

In the antenna module 100E, one antenna block 107 is eliminated and four antenna blocks 107 are disposed along a long-side direction of the dielectric substrate 130A. In other words, the position of one of the antenna blocks 107 in the antenna module 100D is changed to the end portion in the X-axis negative direction. Moreover, in the antenna module 100E, the dimension in the X-axis direction of a Sip module 105E is shorter than that in the antenna module 100 and a reduction in the size is thus achieved. Therefore, the entire dimension in the X-axis direction of the dielectric substrate 130A is reduced.

With this arrangement, radio waves can also be radiated toward the X-axis negative direction, and radio waves can thus be radiated over a wider range. Thus, EIRP and CDF can be improved while TRP being maintained.

Aspects (First aspect) An antenna module according to an aspect includes a first substrate at which a first radiating element with a flat plate shape is disposed, and a second substrate at which a second radiating element with a flat plate shape is disposed. The first substrate has a first surface and a second surface that are opposite each other. The first radiating element is disposed on the second surface of the first substrate or at a position between the first surface and the second surface of the first substrate. A recessed part that is recessed in a normal direction of the first surface is formed on the first surface of the first substrate. The second substrate includes a first region that is arranged so as to fit into the recessed part and a second region that is in contact with the first surface of the first substrate. A normal direction of the second radiating element is different from a normal direction of the first radiating element.

(Second aspect) In the antenna module according to the first aspect, the second substrate includes a connection electrode that is disposed in the second region and allows electrical connection with the first substrate. A high frequency signal is transmitted via the connection electrode to the second radiating element.

(Third aspect) In the antenna module according to the first or second aspect, in a case where the antenna module is seen in a plan view from a normal direction of the first substrate, at least part of the second substrate projects outward relative to an outermost peripheral end portion of the first substrate.

(Fourth aspect) In the antenna module according to any one of the first to third aspects, the second substrate projects out in a normal direction of the first substrate from the first surface.

(Fifth aspect) In the antenna module according to the fourth aspect, the second substrate projects out in the normal direction of the first substrate from the second surface.

(Sixth aspect) In the antenna module according to any one of the first to fifth aspects, the recessed part is formed up to a side surface of the first substrate.

(Seventh aspect) In the antenna module according to any one of the first to sixth aspects, the normal direction of the second radiating element is orthogonal to the normal direction of the first radiating element.

(Eighth aspect) In the antenna module according to any one of the first to sixth aspects, an angle formed between the normal direction of the second radiating element and the normal direction of the first radiating element is larger than 90 degrees and smaller than 180 degrees.

(Ninth aspect) The antenna module according to any one of the first to eighth aspects further includes a first ground electrode that is disposed between the first surface and the first radiating element at the first substrate and a second ground electrode that is disposed opposite the second radiating element at the second substrate.

(Tenth aspect) In the antenna module according to any one of the first to ninth aspects, each of the first radiating element and the second radiating element is capable of radiating radio waves polarized in different two directions.

(Eleventh aspect) In the antenna module according to any one of the first to tenth aspects, the first radiating element includes a first element capable of radiating a radio wave in a first frequency range and a second element capable of radiating a radio wave in a second frequency range lower than the frequency range of the radio wave radiated from the first element, the first element and the second element being disposed opposite each other.

(Twelfth aspect) In the antenna module according to any one of the first to eleventh aspects, the second radiating element includes a third element capable of radiating a radio wave in a third frequency range and a fourth element capable of radiating a radio wave in a fourth frequency range lower than the frequency range of the radio wave radiated from the third element, the third element and the fourth element being disposed opposite each other.

(Thirteenth aspect) The antenna module according to any one of the first to twelfth aspects further includes a power feed device that supplies a high frequency signal to the first radiating element and the second radiating element.

(Fourteenth aspect) In the antenna module according to the thirteenth aspect, the power feed device is disposed on the first surface.

(Fifteenth aspect) The antenna module according to the first aspect further includes a power feed device and a power feed wire. The power feed device supplies a high frequency signal to the first radiating element and the second radiating element. The power feed wire allows a high frequency signal to be transmitted from the power feed device to the second radiating element. The second substrate includes a connection electrode that is disposed in the second region and allows electrical connection with the first substrate. The power feed wire passes through the first substrate and is connected via the connection electrode to the second radiating element.

(Sixteenth aspect) The antenna module according to any one of the first to fifteenth aspects further includes a third substrate at which a third radiating element with a flat plate shape is disposed. The third substrate is disposed adjacent to the second substrate in a first direction. A normal direction of the third radiating element is the same as the normal direction of the second radiating element.

(Seventeenth aspect) The antenna module according to the sixteenth aspect further includes a fourth radiating element with a flat plate shape that is disposed adjacent to the first radiating element in the first direction at the first substrate.

(Eighteenth aspect) In the antenna module according to any one of the first to seventeenth aspects, in a case where a direction that is orthogonal to a direction going from the first region toward the first radiating element and is along the first surface is defined as a second direction, the second region extends from the first region toward the second direction.

(Nineteenth aspect) In the antenna module according to any one of the first to seventeenth aspects, the second region extends in a third direction going from the first region toward the first radiating element.

(Twentieth aspect) The antenna module according to any one of the first to nineteenth aspects further includes a connector that is disposed on the first surface and electrically connects to an external apparatus.

(Twenty-first aspect) A communication apparatus provided with the antenna module according to any one of the first to twentieth aspects.

The exemplary embodiments disclosed herein are to be considered in all respects to be illustrative and not restrictive. The scope of the present disclosure is defined by the claims, rather than the exemplary embodiments described above, and is intended to include all modifications within the meaning and scope equivalent to the scope of the claims.

REFERENCE SIGNS LIST

10 communication apparatus, 100, 100A to 100E antenna module, 105, 105E Sip module, 106 connector, 107, 107A to 107E antenna block, 108 main substrate, 110A to 110D power feed circuit, 110 BBIC, 111A to 111D, 113A to 113D, 117 switch, 112AR to 112DR low noise amplifier, 112AT to 112DT power amplifier, 114A to 114D attenuator, 115A to 115D phase shifter, 116 signal combiner/splitter, 118 mixer, 119 amplifier circuit, 120 antenna device, 121, 121A, 121B, 122A, 122B radiating electrode, 125A, 125B radiating element, 130A, 130B, 130B1 to 130B3, dielectric substrate, 131A, 131B, 132A, 133B main surface, 141A, 141B, 142A, 142B power feed wire, 151, 152 connection electrode, 170 recessed part, 200 BBIC, GND1, GND2, GND2A ground electrode, SP1B, SP1A, SP2B, SP2A power feed point.

The invention claimed is:

1. An antenna module comprising:

a first substrate at which a first radiating element with a flat plate shape is disposed, the first substrate having a first surface and a second surface that are opposite each other; and a second substrate at which a second radiating element is disposed, wherein the first radiating element is disposed on the second surface of the first substrate or at a position between the first surface and the second surface of the first substrate, wherein the second substrate includes:

a first region that is arranged so as to abut the first substrate between the first surface of the first substrate and the second surface of the first substrate, and a second region that is in contact with the first surface of the first substrate, and wherein a normal direction of the second radiating element is different from a normal direction of the first radiating element.

2. The antenna module according to claim 1, wherein a recessed part that is recessed in a normal direction of the first surface is formed on the first surface of the first substrate, and wherein the first region of the second substrate is arranged so as to fit into the recessed part.

3. The antenna module according to claim 1, wherein the second radiating element has a flat shape.

4. The antenna module according to claim 1, wherein the second substrate includes a connection electrode that is disposed in the second region and allows electrical connection with the first substrate, and wherein a high frequency signal is transmitted via the connection electrode to the second radiating element.

5. The antenna module according to claim 1, wherein in a case where the antenna module is seen in a plan view from a normal direction of the first substrate, at least part of the second substrate projects outward relative to an outermost peripheral end portion of the first substrate.

6. The antenna module according to claim 1, wherein the second substrate projects out in a normal direction of the first substrate from the first surface.

7. The antenna module according to claim 6, wherein the second substrate projects out in the normal direction of the first substrate from the second surface.

8. The antenna module according to claim 2, wherein the recessed part is formed up to a side surface of the first substrate.

9. The antenna module according to claim 1, wherein an angle formed between the normal direction of the second radiating element and the normal direction of the first radiating element is larger than 90 degrees and smaller than 180 degrees.

10. The antenna module according to claim 1, further comprising:

a first ground electrode that is disposed between the first surface and the first radiating element at the first substrate; and a second ground electrode that is disposed opposite the second radiating element at the second substrate.

11. The antenna module according to claim 1, wherein at least one of:

the first radiating element includes a first element capable of radiating a radio wave in a first frequency range and a second element capable of radiating a radio wave in a second frequency range lower than the first frequency range of the radio wave radiated from the first element, the first element and the second element being disposed opposite each other, or the second radiating element includes a third element capable of radiating a radio wave in a third frequency range and a fourth element capable of radiating a radio wave in a fourth frequency range lower than the third frequency range of the radio wave radiated from the third element, the third element and the fourth element being disposed opposite each other.

12. The antenna module according to claim 1, further comprising a power feed device that supplies a high frequency signal to the first radiating element and the second radiating element, wherein the power feed device is disposed on the first surface.

13. The antenna module according to claim 1, further comprising:

a power feed device that supplies a high frequency signal to the first radiating element and the second radiating element; and a power feed wire that allows a high frequency signal to be transmitted from the power feed device to the second radiating element, wherein the second substrate includes a connection electrode that is disposed in the second region and allows electrical connection with the first substrate, and wherein the power feed wire passes through the first substrate and is connected via the connection electrode to the second radiating element.

14. The antenna module according to claim 1, further comprising:

a third substrate at which a third radiating element with a flat plate shape is disposed, wherein the third substrate is disposed adjacent to the second substrate in a first direction, and wherein a normal direction of the third radiating element is the same as the normal direction of the second radiating element.

15. The antenna module according to claim 14, further comprising a fourth radiating element with a flat plate shape that is disposed adjacent to the first radiating element in the first direction at the first substrate.

16. The antenna module according to claim 1, wherein, in a case where a direction that is orthogonal to a direction going from the first region toward the first radiating element and is along the first surface is defined as a second direction, the second region extends from the first region toward the second direction.

17. The antenna module according to claim 1, wherein the second region extends in a third direction going from the first region toward the first radiating element.

18. The antenna module according to claim 1, further comprising a connector that is disposed on the first surface and electrically connects to an external apparatus.

19. A kit for an antenna module comprising, a first substrate including an upper main surface and a lower main surface, wherein a first connecting electrode is mounted on the upper main surface, a first radiating element is mounted on the lower main surface, and a recess is formed in the first substrate; and a second substrate including a first portion and a second portion, wherein a second radiating element is mounted on the first portion, a second connecting electrode is mounted on the second portion, and a width of the first portion is smaller than width of the recess.

20. A method for assembling an antenna module comprising:

obtaining a first substrate including an upper main surface and a lower main surface, wherein a first connecting electrode is mounted on the upper main surface, a first radiating element is mounted on the lower main surface, and a recess is formed in the first substrate;

obtaining a second substrate including a first portion and a second portion, wherein a second radiating element is mounted on the first portion, a second connecting electrode is mounted on the second portion, and a width of the first portion is smaller than width of the recess;

mounting the second substrate onto the first substrate such that the first portion fits into the recess; and connecting the first connecting electrode and the second connecting electrode.

* * * * *